Nov. 17, 1925.
C. D. STEWART
1,561,670
VEHICLE BRAKE
Filed Oct. 4, 1922
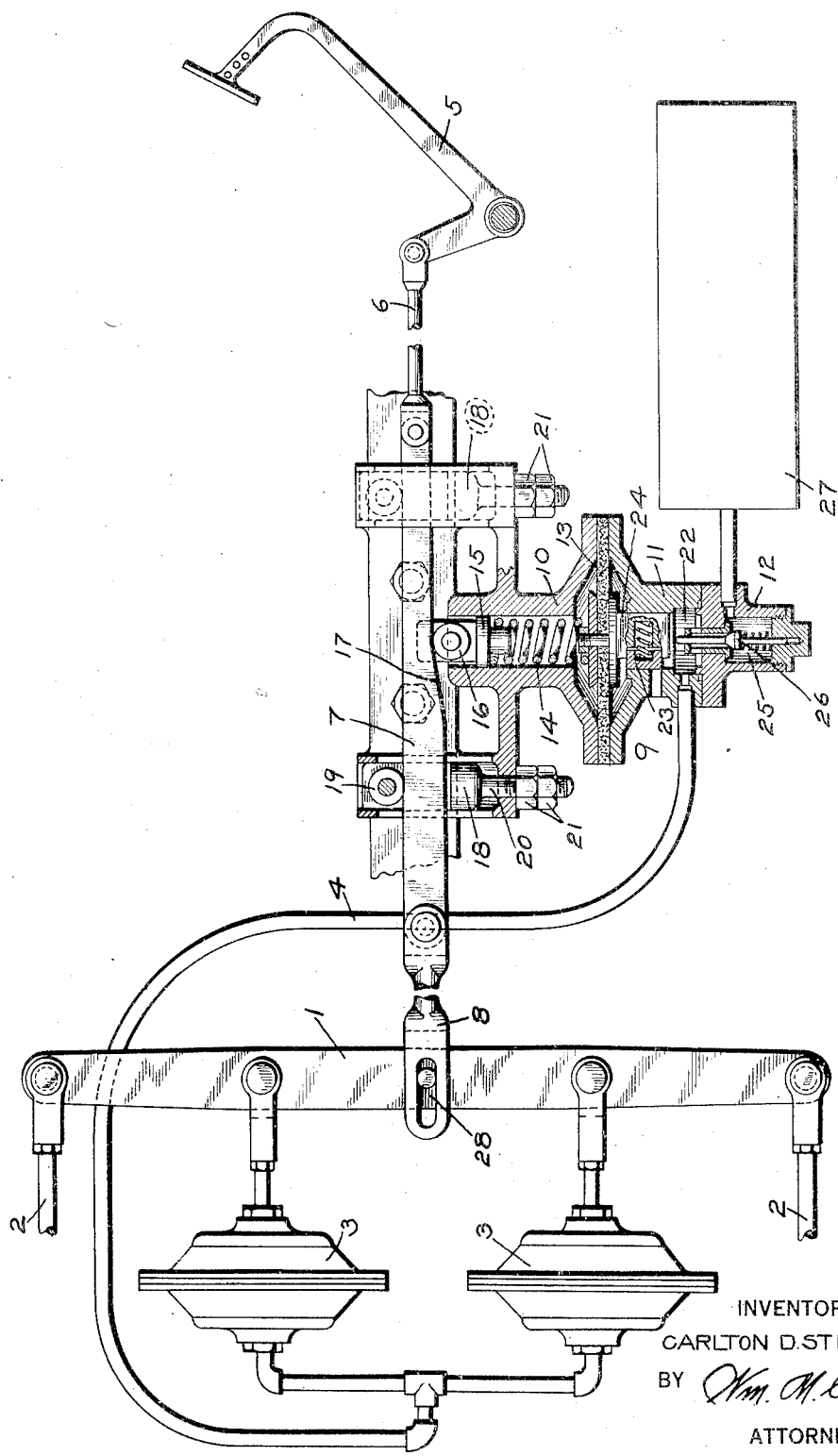
INVENTOR
CARLTON D. STEWART
BY *Wm. M. Cady*
ATTORNEY Patented Nov. 17, 1925.

1,561,670

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE.

Application filed October 4, 1922. Serial No. 592,284.

*To all whom it may concern:*

Be it known that I, CARLTON D. STEWART, a citizen of the United States, residing at Berkeley, in the county of Alameda, and State of California, have invented new and useful Improvements in Vehicle Brakes, of which the following is a specification.

This invention relates to fluid pressure brakes, and more particularly to a brake equipment adapted for use on automotive vehicles.

The principal object of my invention is to provide an improved brake of the above character, in which the operation of the fluid pressure brake is interlocked with the ordinary manually operated mechanical brake.

In the accompanying drawing, the single figure is a diagrammatic view, partly in section, of an automatic fluid pressure brake equipment embodying my invention.

As shown in the drawing, the equipment may comprise an equalizing bar 1, which may be the usual existing construction and which has the usual brake pull rods 2 attached to the opposite ends.

Operatively connected to the bar 1 are one or more brake cells 3, which may be of the diaphragm type, such that the admission of fluid under pressure through pipe 4 to the brake cells is adapted to apply the brakes, and the release of fluid from the cells effects the release of the brakes. The equalizing bar 1 is operatively connected to the usual foot pedal lever 5 through a pull rod 6, a bar 7, and a link 8, the bar 7 being interposed in the mechanical connections from the foot pedal lever to the equalizing bar for the purpose of controlling the operation of a valve device 9 which controls the admission and release of fluid under pressure to and from the brakes cells 3.

The valve device 9 comprises casing sections 10, 11, and 12 and clamped between the casing sections 10 and 11 is a flexible diaphragm 13. Engaging one side of the diaphragm is a spring 14, the tension of which may be varied by the movement of a member 15. Said member carries a roller 16 adapted to engage the under side of the bar 7 which has a narrow portion and a wide portion connected by an incline 17, so that movement of the bar operates through the incline 17 to depress the roller 16 and thereby effect the compression of the spring 14. The bar 7 may be adjusted with respect to the member 15 by means of guide members 18, having rollers 19 engaging the upper-side of the bar 7 and mounted for vertical adjustment in guide portions carried by the casing section 10. For adjusting, each guide member 18 is provided with a threaded extension 20 having nuts 21 applied so that the member 18 may be adjusted vertically and held in the adjusted position by means of the nuts.

The casing section 11 has a valve chamber 22, connected to pipe 4 and open to one side of diaphragm 13 and said chamber contains a slide valve 23 adapted to be operated by a stem 24 secured to the diaphragm 13. In valve chamber 25 of casing section 12 is a poppet valve 26 having a stem adapted to be operated by the movement of the diaphragm stem 24, for controlling the supply of fluid under pressure from a reservoir 27 to the brake cell pipe 4.

In operation, when the brakes are to be applied the pedal lever 5 is depressed, causing a forward movement of the bar 7, so that the roller 16 engages the incline 17. The spring 14 is then compressed a certain amount, according to the movement of the pedal lever and the extent the roller travels on the incline 17. The diaphragm 13 is then flexed by the pressure of spring 14 and the valve 26 is unseated, so that fluid under pressure is supplied from the reservoir 27 to the brake cells 3.

When the pressure of fluid supplied to the brake cells and acting in valve chamber 22 on the diaphragm 13 slightly exceeds the opposing pressure of spring 14, the diaphragm is moved by fluid pressure to permit the valve 26 to close. If a higher pressure in the brake cells is desired, the pedal lever 5 is pressed down a little farther, so that the roller 16 is further depressed by the incline 17 and the valve 26 is again opened to supply fluid to the brake cells.

Thus the fluid braking pressure may be regulated at will according to the extent the pedal lever 5 is moved.

The link 8 has a slotted connection 28 with the equalizing lever 1, so that the movement of the brake pedal lever 5 to the extent required for operating the valve device 9, does not have any effect in applying the brakes mechanically through the equalizing lever 1, but if for any reason, the fluid pressure brake fails to act to apply the brakes, then a further movement of the pedal lever 5, after the lost motion due to the slotted connection is taken up, operates to effect an application of the brakes mechanically in the usual manner by the movement of the equalizing lever 1 through the mechanical connection to the pedal lever 5.

When the brakes have been applied by fluid under pressure, the brakes may be released by relieving the foot pressure on the pedal lever 5. This permits a rearward movement of the bar 7 so that the roller moves on the incline 17 to relieve the compression of spring 14. The fluid braking pressure in valve chamber 22, acting on the diaphragm 13, then moves the diaphragm so that the exhaust valve 23 is opened to permit the exhaust of fluid from the brake cells.

With the above described construction, it will be seen that normally the brakes may be controlled by fluid under pressure through the operation of the usual mechanical foot controlled brake mechanism, but if, for any reason, the fluid pressure control should fail, then a further movement of the foot pedal will operate to apply the brakes mechanically.

It will be understood that the manual control may be effected by mechanism adapted to be operated either by the hand or the foot of the operator.

Having now described my invention, what I claim as new and desire to secure by Letters Patent, is:

1. In an automotive brake, the combination with a valve device having means for regulating the pressure of fluid supplied for braking and a movable member for operating said means, of a mechanical brake controlling mechanism having a moving connection provided with an incline adapted to engage said member.

2. In an automotive brake, the combination with a mechanical brake applying member, a pedal, and a bar for operatively connecting said pedal with said brake applying member and provided with an inclined face, of a valve device for controlling the fluid pressure for operating the brakes and having a movable operating member adapted to engage said inclined face.

3. In an automotive brake, the combination with a mechanical brake applying member, a pedal, and a bar for operatively connecting said pedal with said brake applying member and provided with an inclined face, of a valve device comprising a valve for controlling the fluid pressure for applying the brakes, a movable abutment for operating said valve, a spring acting on said abutment, and a member acting on said spring and adapted to engage said inclined face.

4. In an automotive brake, the combination with a mechanical brake applying member, a pedal, and a bar for operatively connecting said pedal with said brake applying member and provided with an inclined face, of a valve device for controlling the fluid pressure brakes and including a movable operating member adapted to be operated by engagement with said inclined face, a lost motion connection being interposed between the pedal and the brake applying member to prevent operation of the mechanical brake during engagement of said member with said inclined face.

5. In an automotive brake, the combination with a pedal operated lever and a member operatively connected to said lever and provided with an inclined face, of a valve device for controlling the admission and release of fluid under pressure for applying and releasing the brakes and a movable member engaging said inclined face for operating said valve device upon movement of said pedal.

In testimony whereof I have hereunto set my hand.

CARLTON D. STEWART.